US006981178B2

(12) United States Patent
Nardini et al.

(10) Patent No.: US 6,981,178 B2

(45) Date of Patent: Dec. 27, 2005

(54) SEPARATION OF DEBUG WINDOWS BY IDS BIT

(75) Inventors: Lewis Nardini, Dallas, TX (US); Gary L. Swoboda, Sugarland, TX (US); Timothy D. Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 617 days.

(21) Appl. No.: 10/302,449

(22) Filed: Nov. 22, 2002

(65) Prior Publication Data

US 2004/0103348 A1 May 27, 2004

(51) Int. Cl.[7] .............................................. G06F 11/00

(52) U.S. Cl. ........................................ 714/34; 710/260

(58) Field of Search ............................. 714/34, 32, 39, 714/45; 717/124; 710/267

(56) References Cited

U.S. PATENT DOCUMENTS

| | | | | |
|---|---|---|---|---|
| 6,249,881 | B1 * | 6/2001 | Porten et al. | 714/38 |
| 6,324,684 | B1 * | 11/2001 | Matt et al. | 717/124 |
| 6,557,116 | B1 * | 4/2003 | Swoboda et al. | 714/28 |
| 6,732,298 | B1 * | 5/2004 | Murthy et al. | 714/34 |

* cited by examiner

*Primary Examiner*—Robert Beausoliel
*Assistant Examiner*—Marc Duncan
(74) *Attorney, Agent, or Firm*—Robert D. Marshall, Jr.; W. James Brady, III; Frederick J. Telecky, Jr.

(57) ABSTRACT

A central processing unit that enables real time interrupts during a debug halt stores an interrupt during debug bit corresponding to the return address upon detection of an interrupt. The interrupt during debug bit has a first digital state if the central processing unit is in a debug halt state and a second digital state if the central processing unit is not in a debug halt state. Upon return from an interrupt the central processing unit enter a debug halt state if the interrupt during debug bit has the first state. The return address and the interrupt during debug bit can be embodied in a push-pop stack. The interrupt during debug bit register can be an unused least significant bit of the return address.

6 Claims, 3 Drawing Sheets

SEPARATION OF DEBUG WINDOWS BY IDS BIT

TECHNICAL FIELD OF THE INVENTION

The technical field of this invention is emulation hardware particularly for highly integrated digital signal processing system.

BACKGROUND OF THE INVENTION

Advanced wafer lithography and surface-mount packing technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

Separation of real-time and non-real-time debug windows requires the state to be maintained by an instruction set architecture (ISA) supporting real-time debug. Background is defined as non-real-time debug and foreground is defined as real-time debug. There is a state that defines the transition from background to foreground. This state is used to support real-time execution control and to control trace windows between background and foreground.

Real-time debug permits a processor to re-start execution in order to service real-time interrupt service routines (ISRs) while stopped by emulation halt conditions. Real-time debug returns from such a real-time interrupt and resumes its prior halted state.

BRIEF DESCRIPTION OF THE DRAWINGS

These and other aspects of this invention are illustrated in the drawings, in which.

DETAILED DESCRIPTION OF PREFERRED EMBODIMENTS

To support real-time debug in a processor that processor must trap a state which permits it to return to the same debug state. This invention tags a debug process as having a specific level in much the same way as protection is dealt with in terms of user and supervisor. This solves a unique problem with a unique context in terms of real-time debug.

A single bit traps the unique conditions describing real-time interrupts occurring while stopped on a emulation debug state. This single bit is part of the architectural state within the processor.

This state bit supports the transition from background to foreground. This state bit is included in architectural registers permitting ease of context maintenance for existing and future user interrupt service routines. This bit is called the Interrupted During Debug (IDS) bit. The IDS bit is set whenever a user defined real-time interrupt occurs while the target processor is halted by emulation. This IDS bit resides in all return pointer registers supported by the instruction set architecture. On return from a user interrupt service routine via a branch to the return pointer will also return the IDS bit. This allows the processor to know that the interrupt service routine has returned back to the debug halted state. The IDS bit traverses the pipeline to the branch target, halting of the processor at the exact same pipeline cycle it had previously stopped is achieved. The IDS bit separates trace streams between foreground and background debug windows via a pipeline flattener.

Figure 1:
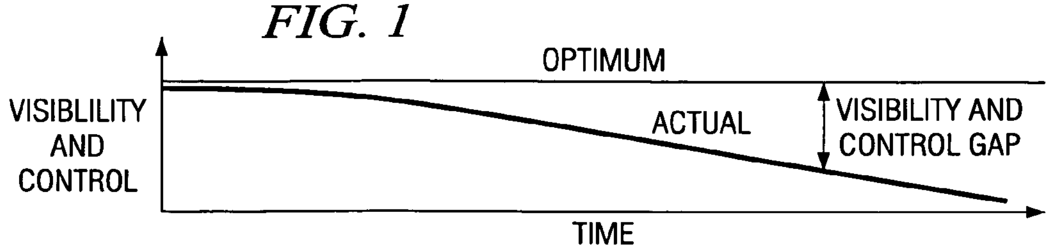
FIG. 1 illustrates the visibility and control of typical integrated circuits as a function of time due to increasing system integration.
Figure 2:
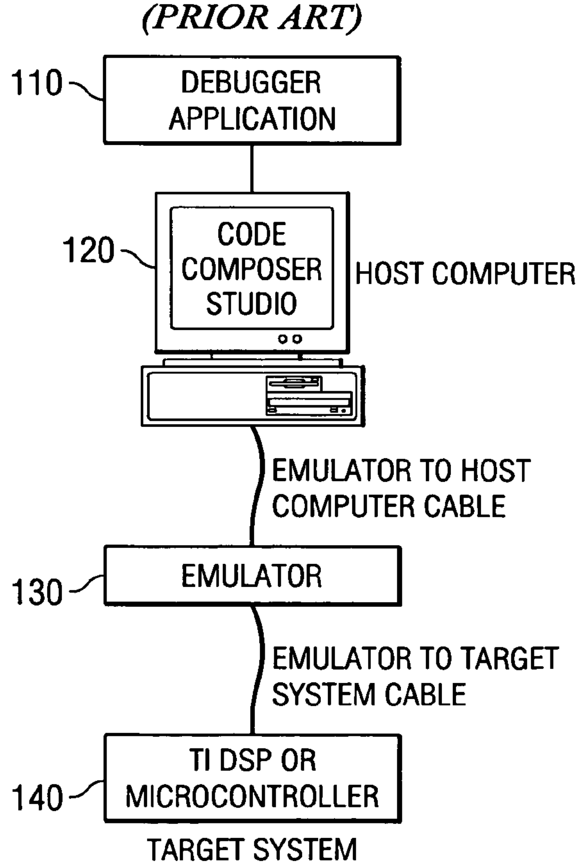
FIG. 2 illustrates an emulation system to which this invention is applicable.
Figure 3:
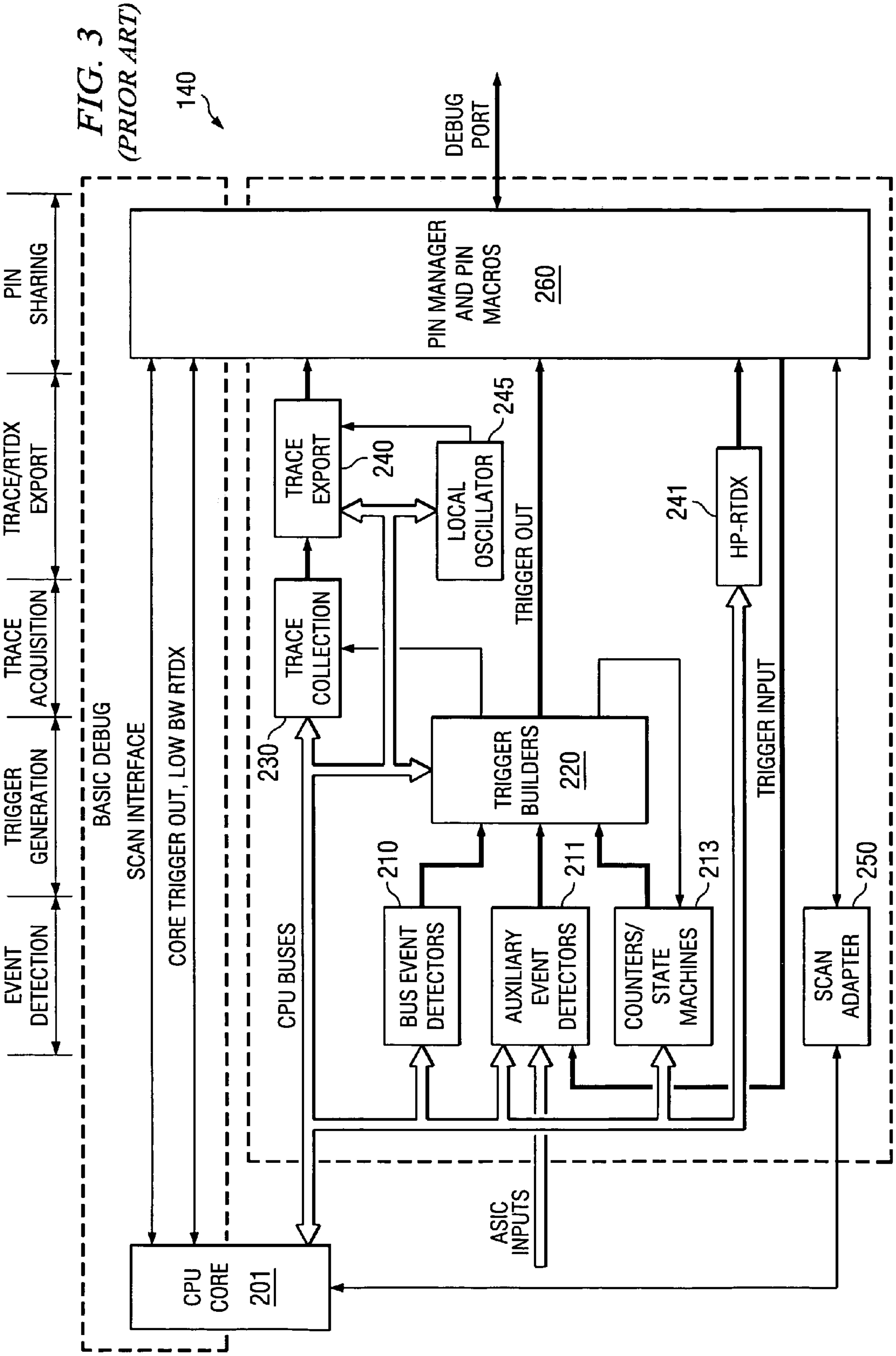
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/ state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

The execution control facilities offer two modes of operation, stop mode and real-time. These modes differ as to how CPU core 201 handles maskable interrupts, non-maskable interrupts, and reset after code execution is halted. The halt of code execution can be caused by the user from debugger application program 110 via a keyboard or mouse input, via a software breakpoint or via a hardware breakpoint or watchpoint. All interrupts and resets are disabled at this point when operating in stop mode. In the real-time mode, reset and non-maskable interrupts (NMI) can always be serviced along with those maskable interrupts designated as real-time events. The real-time facilities are implemented without the assistance of a monitor program for CPU cores 201 with pipelines that allow an interrupt between each instruction. A monitor program is required to support real-time operation for those pipelines that do not meet the interrupt between each instruction criteria.

The real-time aspects of this capability provides for the execution of interrupt driven code while the execution of background code is stopped to perform debug operations. Facilities are provided to define each interrupt as either a real-time or a non-real-time event. Interrupts defined as real-time events are continually serviced, even while the debug of background code occurs. Interrupts defined as non-real-time events can be serviced as long as the debug facilities have not stopped the application. The real-time execution of the time critical code is thus transparent to the developer.

The registers of CPU core 201 are viewed when the application has been halted. The register view corresponds to the machine state at the stop point. The debug software and hardware assure that the register activity that occurs as a result of real-time interrupts is transparent to the user. All register changes affect only registers values relative to the stop point. Memory is also displayed and changed relative to the stop point. Alternately, memory may be viewed and changed independent of whether a stop point has occurred. Debug related memory accesses can be constrained to bus cycles where CPU core 201 has not created a memory access. This makes debug related accesses transparent to the application when the these accesses target zero wait state memory.

A shared hardware component provides two hardware breakpoints, an address and data watchpoint or low bandwidth real-time data exchange capabilities. This hardware block also provides a parallel signature analysis function in some implementations. The hardware breakpoints provide a means for setting breakpoints in ROM. The watchpoint provides for the detection of memory read and writes of specific data patterns to an address.

Figure 4:
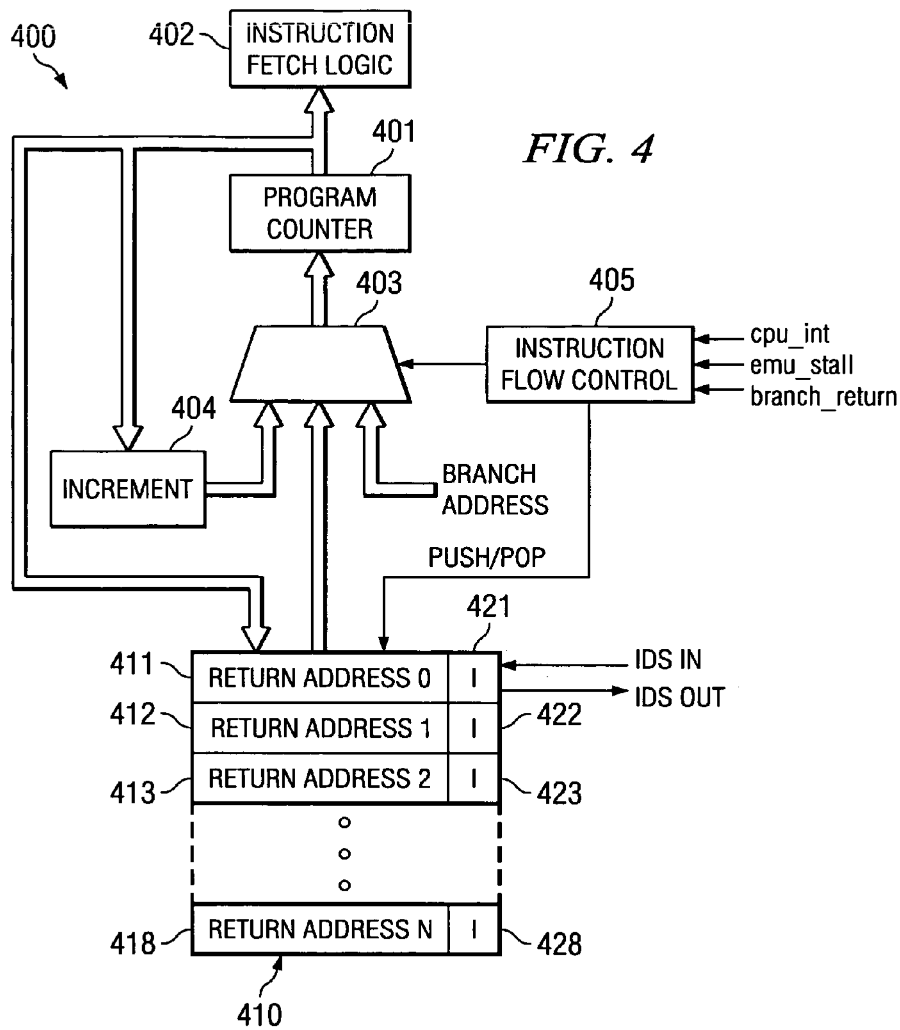
FIG. 4 illustrates the use of an IDS bit in the interrupt return address stack.

FIG. 4 illustrates in block diagram form some of the program flow control apparatus 400 of an example CPU core 201 employing this invention. Program counter 401 stores the address of the next instruction. This address is supplied to instruction fetch logic 402 which recalls this next instruction from memory (not shown). Program counter 401 is updated via multiplexer 403 under control of instruction flow control 405. The output of program counter 401 is supplied to increment logic 404, which advances the address to the next instruction boundary. Instruction flow control 405 controls multiplexer 403 to select either the next instruction address from increment logic 404, a branch address or an interrupt return address from interrupt return stack 410. Note the branch address can be any out of sequence address such as from a branch instruction, a subroutine call or return or an interrupt branch.

Interrupt subroutine stack 410 includes plural push down return address registers 411, 412, 413 . . . 418. Each return address register 411, 412, 413 . . . 418 has a corresponding interrupt during suspend (IDS) bit 421, 422, 423 . . . 428. On receipt of an interrupt, instruction flow control 405 causes interrupt subroutine stack 410 to store the current contents of program counter 401 at the top of the stack. Other return addresses are pushed down the stack. At same time instruction flow control 405 controls multiplexer 403 to load program counter 401 with the branch address to the start of the corresponding interrupt service routine.

The corresponding IDS bits 412, 422, 423 . . . 428 mark the emulation mode when the interrupt occurs. If CPU core 201 is in normal operation mode or in emulation stop mode, then a "0" is stored in the top IDS bit 421 along side the corresponding interrupt return address 411. If CPU core 201 is in emulation real-time, then top IDS bit 421 stores a "1". The bit is loaded via an IDS input from an emulation control function (not illustrated) according to the then current state of CPU core 201.

Upon completion of the interrupt service routine, instruction flow control 405 controls multiplexer 403 to load program counter 401 with the return address form the top of interrupt return stack 410, namely the address then stored in return address register 411. IDS bit 421 is output to the emulation control function (not show), indicating the emulation state at the beginning of the interrupt service routine. At the same time, instruction flow control 405 sends a pop command to interrupt return stack 410. This discards the return address 0 and the IDS at the top of the stack. The IDS bit is pushed and popped on interrupt return stack 410 in conjunction with the corresponding return address. Note as previously mentioned, only nonmaskable interrupts and certain designated real-time maskable interrupts are serviced during the real-time emulation state.

As previously described above, the IDS bit signals CPU core 201 that the interrupt service routine has returned back to the real-time emulation state. The IDS bit traverses the pipeline to the branch target, halting of the processor at the exact same pipeline cycle it had previously stopped is achieved. The IDS bit separates trace streams between foreground and background debug windows via a pipeline flattener.

Figure 5:
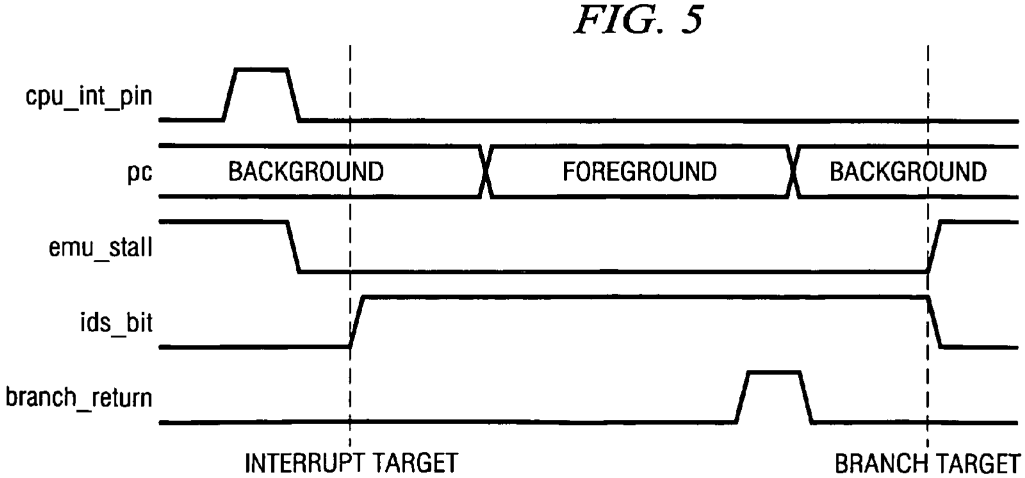
FIG. 5 illustrates the timing of a real-time interrupt and return while in real-time emulation mode.

FIG. 5 illustrates the timing of a real-time interrupt event at the input to CPU core 201. The signal cpu_int_pin goes high signaling receipt of the interrupt. In turn this causes the emulation state (emu_stall) to go from active "1" to inactive "0" for the duration of the interrupt service routine. The IDS bit supplied to interrupt return stack 400 goes to "1" at the interrupt target address. The program counter initially traverses background code, which is this case is halted. Addition background code may be executed to empty the instruction pipeline of CPU core 201 prior to entering the interrupt service routine. Then the program counter traverses the interrupt service routine as foreground code. Upon completion of the interrupt service routine, the branch_return signal becomes active. This signals instruction flow control 405 to pop interrupt return stack 410. The program counter returns to the background code which may require instructions before the branch target address to refill the instruction pipeline. Popping the interrupt return stack permits IDS bit 421 to signal that the interrupt was taken while in real-time emulation mode enabling CPU core 210 to reenter that mode. Upon reaching the branch target address, and returns on branching back to the original location IDS-bit is cleared but CPU core 201 reenters real-time emulation mode, signaled by emu_stall returning to "0".

In support of real-time the IDS-bit allows the correct architectural return state from a real-time designated interrupt. Thus multiple debug windows can occur in succession with consistent alignment of debug state (real-time emulation state) to the correct program counter.

What is claimed is:

1. In a central processing unit that enables real time interrupts during a debug halt, the method comprising the steps of:

storing a return address corresponding to a current program counter address upon detection of an interrupt;

storing an interrupt during debug bit corresponding to the stored return address having a first digital state if the central processing unit is in a debug halt state and a second digital state if the central processing unit is not in a debug halt state;

upon return from an interrupt moving the return address to the program counter, and entering a debug halt state if the interrupt during debug bit has the first state.

2. The method of claim 1, wherein:

said step of storing a return address and said step of storing an interrupt during debug bit employs a push-pop stack pushing the return address and the interrupt during debug bit on top of the stack upon an interrupt and popping the return address and the interrupt during debug bit from top of the stack upon a return from interrupt.

3. The method of claim 1, wherein:

the central processing unit operates on instructions having a minimum instruction length greater than the minimum addressable data length of the program counter whereby the program counter includes at least one least significant bit that is always 0 for a valid instruction boundary; and said step of storing an interrupt during debug bit consists of storing the interrupt during debug bit in one of said at least one least significant bit that is always 0.

4. A central processing unit that enables real time interrupts during a debug halt comprising:

a program counter storing an address of a next instruction;

an interrupt return address register;

an interrupt during debug bit register; and an instruction flow control unit responsive to interrupts operative to storing an address stored in said program counter in said interrupt return address register upon detection of an interrupt, storing an interrupt during debug bit having a first digital state if the central processing unit is in a debug halt state and a second digital state if the central processing unit is not in a debug halt state upon detection of an interrupt, store an address stored in said return address register in said program counter upon return from an interrupt, and entering a debug halt state upon return from an interrupt if the interrupt during debug bit has said first state.

5. The central processing unit of claim 4, wherein:

said interrupt return address register and said interrupt during debug bit register are embodied in a push-pop stack; and said instruction flow control unit is further operative to push said program counter address and said interrupt during debug bit on top of the stack upon an interrupt, and pop said return address and the interrupt during debug bit from top of the stack upon a return from interrupt.

6. The central processing unit of claim 5, wherein:

said central processing unit operates on instructions having a minimum instruction length greater than the minimum addressable data length of the program counter whereby the program counter includes at least one least significant bit that is always 0 for a valid instruction boundary; and said interrupt during debug bit register consist of one of said at least one least significant bit that is always 0.

* * * * *